(12) United States Patent
Morales

(10) Patent No.: US 8,594,446 B2
(45) Date of Patent: Nov. 26, 2013

(54) METHOD FOR ENHANCING A DIGITIZED DOCUMENT

(75) Inventor: Efrain Orlando Morales, Rochester, NY (US)

(73) Assignee: Eastman Kodak Company, Rochester, NY (US)

(*) Notice: Subject to any disclaimer, the term of this patent is extended or adjusted under 35 U.S.C. 154(b) by 142 days.

(21) Appl. No.: 13/348,676

(22) Filed: Jan. 12, 2012

(65) Prior Publication Data

US 2013/0182950 A1     Jul. 18, 2013

(51) Int. Cl.
G06K 9/40     (2006.01)

(52) U.S. Cl.
USPC .......................... 382/254; 382/260; 382/270

(58) Field of Classification Search
USPC ............................. 382/254, 260–275
See application file for complete search history.

(56) References Cited

U.S. PATENT DOCUMENTS

| | | | |
|---|---|---|---|
| 5,012,333 A | 4/1991 | Lee et al. | |
| 5,454,044 A | 9/1995 | Nakajima | |
| 5,905,817 A * | 5/1999 | Matama | 382/260 |
| 6,285,798 B1 * | 9/2001 | Lee | 382/260 |
| 6,317,521 B1 | 11/2001 | Gallagher et al. | |
| 6,343,158 B1 * | 1/2002 | Shiohara | 382/261 |
| 6,351,566 B1 | 2/2002 | Zlotnick | |
| 6,549,678 B1 * | 4/2003 | Gindele et al. | 382/254 |
| 6,941,013 B1 | 9/2005 | Drayer | |
| 7,057,595 B1 | 6/2006 | Benyoub | |
| 7,158,686 B2 | 1/2007 | Gindele | |
| 7,181,086 B2 * | 2/2007 | Gindele et al. | 382/265 |
| 7,215,821 B2 * | 5/2007 | Schuhrke et al. | 382/254 |
| 7,280,703 B2 * | 10/2007 | Gallagher et al. | 382/260 |
| 7,636,467 B2 | 12/2009 | Burian et al. | |
| 7,970,234 B2 * | 6/2011 | Park et al. | 382/275 |
| 2005/0265625 A1 * | 12/2005 | Li et al. | 382/274 |
| 2008/0002906 A1 * | 1/2008 | Wang et al. | 382/270 |

* cited by examiner

Primary Examiner — Li Liu
(74) Attorney, Agent, or Firm — Kevin E. Spaulding

(57) ABSTRACT

A method for enhancing a digitized image of a document containing text or graphics. The digitized image is decomposed into a low-frequency pedestal image and a high-frequency residual image. A first gain factor image is determined by applying a first tonescale function to the residual image, and a second gain factor image is determined by applying a second tonescale function to the residual image pixel values, wherein parameters defining the tonescale functions are determined by analyzing the pedestal and residual images. An enhanced document image is formed by combining a scaled pedestal image determined by multiplying the pedestal image by the first gain factor image, and a scaled residual image determined by multiplying the residual image by the second gain factor image.

23 Claims, 8 Drawing Sheets

METHOD FOR ENHANCING A DIGITIZED DOCUMENT

FIELD OF THE INVENTION

This invention pertains to the field of digital image enhancement and more particularly to a method for enhancing a digitized document.

BACKGROUND OF THE INVENTION

Digital scanners (e.g., flatbed scanners) generally illuminate a document with a uniform intensity of light having a known illumination spectrum from a controlled light source and capture a digital image of the document using a digital sensor having a plurality of sensor pixels. The reflectance over a small area of the document can be determined from the sensed pixel value for a corresponding sensor pixel that captures the light reflected by the small document area. The collection of the sensed pixel values comprises a digitized document.

Many digital scanners provide various image correction and enhancement algorithms for processing the digitized document. One class of algorithms that is commonly applied is background correction wherein the background reflectance of the digitized document is automatically determined and corrected to render it to a specified color (e.g., white).

When utilizing other means of digitizing a document, such as by capturing an image of the document using a digital camera or camera phone, the illumination of the document is often uncontrolled and unknown. Therefore, the reflectance across the document background cannot be easily determined and used to automatically correct the background of the digitized document. Digital cameras and camera phones typically perform automatic white balancing, but often the white balancing is designed to balance indoor or outdoor scenes rather than images of documents, and therefore the automatic white balancing often performs poorly when applied to a digitized document.

Binarization methods that set the background to white and the text or graphics to black are sometimes used to process digitized documents in order to improve the legibility of the document. A digitized document can also be binarized to save digital memory space but this aspect of binarization is not discussed here.

The simplest binarization method, one that is well-known to those skilled in the art, is to employ a global thresholding operation. Any pixel values in the digitized document that are above a specified global threshold are set to white and any pixel values that are below the global threshold are set to black. A drawback of this simple method is that it produces visually unpleasant binarized documents in the presence of illumination non-uniformity and imaging noise. The artifacts that this method can produce include ragged edges and clouds of black dots in areas where the illumination during digitization was darker than other areas of the document. Many methods have been disclosed that increase the complexity of binarization in order to produce visually-pleasing binarized documents.

A binarization method as described by Burian et al. in U.S. Pat. No. 7,636,467, entitled "Binarization of an image," employs locally-adapted thresholds derived from moving pixel sums followed by corrections using binary median and binary morphological operations. The binary correction steps significantly increase the complexity of this method.

Another binarization method is described in U.S. Pat. No. 6,941,013 to Drayer, entitled "Method of image binarization using histogram modeling," wherein pixel value histograms are modeled. Each pixel value is classified as being either foreground or background based on the pixel value histogram, and the classified pixel values are quantized accordingly. The histogram modeling step significantly increases the complexity of this method.

U.S. Pat. No. 6,351,566 to Zlotnick, entitled "Method for image binarization," describes a binarization method that includes optimizing a merit function to find a middle threshold and a pixel value difference parameter responsive to the statistics of the pixel values. A trinarizing operation is applied to the image using the middle threshold and the pixel value difference parameter, and the middle-valued pixels are then binarized in the trinary image to form a binary image. The optimization step significantly increases the complexity of this method.

U.S. Pat. No. 7,057,595 to Benyoub et al., entitled "Image binarization method," discloses an approach that combines several binarization methods to produce a binarized image. This method is computationally complex because it requires performing a plurality of separate binarization methods in order to produce a binarized image.

One way to keep computational complexity low while producing a visually-pleasing document image is to produce a grayscale document, rather than a binary document, where the background of the grayscale document is essentially white and the foreground is essentially black. The simplest way to produce a grayscale image with an essentially white background and an essentially black foreground is to apply a global tonescaling function to the digitized document that increases the image contrast. A drawback of this simple method is that it produces visually unpleasant documents in the presence of illumination non-uniformity and imaging noise because the method treats foreground and background pixel values the same. The artifacts that the method produces include clouds of dark dots in areas where the illumination during digitization was darker than other areas of the document. Many methods have been disclosed that selectively change the contrast of an image by altering pixel values in a way that is responsive to the image pixel values.

A method described by Lee in commonly-assigned U.S. Pat. No. 5,012,333, entitled "Interactive dynamic range adjustment system for printing digital images," includes separating an image into a high-frequency image and a low-frequency image by using FIR filters. A tonescale function is applied to only the low-frequency image, and the high-frequency image is added to the tonescaled low-frequency image. Another method to adaptively change the contrast of an image is described in U.S. Pat. No. 5,454,044 to Nakajima, entitled "Apparatus for enhancing image data using a monotonously decreasing function." According to this approach, the contrast of pixel values within regions that have a high mean pixel value are decreased. Both of these methods alter the pixel values in a manner that is adaptive to the image content in order to preserve the high frequencies in the image, but both methods produce undershoot and overshoot artifacts near high-contrast edges. Moreover, neither of these methods teaches how to produce a document image with a background that is essentially white and a foreground that is essentially black.

Commonly-assigned U.S. Pat. No. 6,317,521 to Gallagher et al., entitled "Method for preserving image detail when adjusting the contrast of a digital image," describes a method that also includes separating an input image into a high-frequency image and a low-frequency image, but in addition includes an artifact avoidance function to avoid artifacts such as those produced by the aforementioned U.S. Pat. No. 5,012, 333 and U.S. Pat. No. 5,454,044. However, a drawback of this method, when utilized to process a document image with a background that is essentially white and a foreground that is essentially black, is that it can produce artifacts. The method utilizes an avoidance function which is active only near edges. Within thin lines or letters the avoidance function may switch from being active (i.e., it is significantly less than one) near an edge of a thin line or letter to being inactive (i.e., it is essentially one) near the middle of the thin line or letter to being active again near the opposite edge of the thin line or letter. When the avoidance function is active, essentially only the low-frequency content image is tonescaled and the high-frequency content image is added without tonescaling. When the avoidance function is inactive, essentially the sum of the low-frequency content (comprising positive pixel values) and the high-frequency content (comprising negative pixel values within the aforementioned regions) is tonescaled. The positive pixel values from the low-frequency content will always be larger than the sum of the positive pixel values from the low-frequency content image plus the negative pixel values from the high-frequency content image in the aforementioned regions. Therefore, for a monotonically increasing tonescale, the regions of the tonescaled image within thin lines or letters where the avoidance function is active will be lighter than similar regions where the avoidance function is inactive. This results in artifacts where regions inside of thin lines or letters are reproduced as gray rather than black.

Commonly-assigned U.S. Pat. No. 7,158,686 to Gindele et al., entitled "Enhancing the tonal characteristics of digital images using inflection points in a tone scale function," describes a method to improve the tonal characteristics of a digital image which includes adaptively producing a tonescale function having a highlight tonescale segment and a shadow tonescale segment. However, the method teaches how to improve the tonal characteristics of natural scenes and does not teach how to produce a document image with a background that is essentially white and a foreground that is essentially black.

There remains a need for a computationally efficient method to process a digitized document image captured with non-uniform illumination to provide an enhanced image where the background is essentially white and the text and graphics are essentially black.

SUMMARY OF THE INVENTION

The present invention represents a method for enhancing a document image, the method implemented at least in part by a data processing system and comprising:

receiving a digitized image of a document containing text or graphics, the digitized image including an array of pixels having pixel values;

decomposing the digitized image into a pedestal image and a residual image, low-spatial-frequency content in the digitized image being primarily represented by the pedestal image and high-spatial-frequency content in the digitized image being primarily represented by the residual image;

determining a first gain factor image wherein the pixel values of the first gain factor image are a continuous monotonic function of the corresponding residual image pixel values, wherein the first gain factor image pixel values are being substantially equal to a first maximum gain for non-negative residual image pixel values, and the first gain factor image pixel values are being substantially equal to a first minimum gain for residual image pixel values that are less than a first residual threshold;

determining a second gain factor image wherein the pixel values of the second gain factor image are a continuous monotonic function of the corresponding residual image pixel values, the second gain factor image pixel values being substantially equal to a second minimum gain for non-negative residual image pixel values, and the second gain factor image pixel values being substantially equal to a second maximum value for residual image pixel values less than a second residual threshold;

determining a scaled pedestal image by multiplying the pedestal image by the first gain factor image;

determining a scaled residual image by multiplying the residual image by the second gain factor image;

determining an enhanced document image by combining the scaled pedestal image and the scaled residual image; and storing the enhanced document image in a processor accessible memory.

This invention has the advantage that it produces an enhanced document image with a background that is essentially white and a foreground that is essentially black.

It has the additional advantage that it is computationally simple while producing a visually-pleasing document image.

DETAILED DESCRIPTION OF THE INVENTION

In the following description, some embodiments of the present invention will be described in terms that would ordinarily be implemented as software programs. Those skilled in the art will readily recognize that the equivalent of such software may also be constructed in hardware. Because image manipulation algorithms and systems are well known, the present description will be directed in particular to algorithms and systems forming part of, or cooperating more directly with, the method in accordance with the present invention. Other aspects of such algorithms and systems, together with hardware and software for producing and otherwise processing the image signals involved therewith, not specifically shown or described herein may be selected from such systems, algorithms, components, and elements known in the art. Given the system as described according to the invention in the following, software not specifically shown, suggested, or described herein that is useful for implementation of the invention is conventional and within the ordinary skill in such arts.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting. It should be noted that, unless otherwise explicitly noted or required by context, the word "or" is used in this disclosure in a non-exclusive sense.

Figure 1:
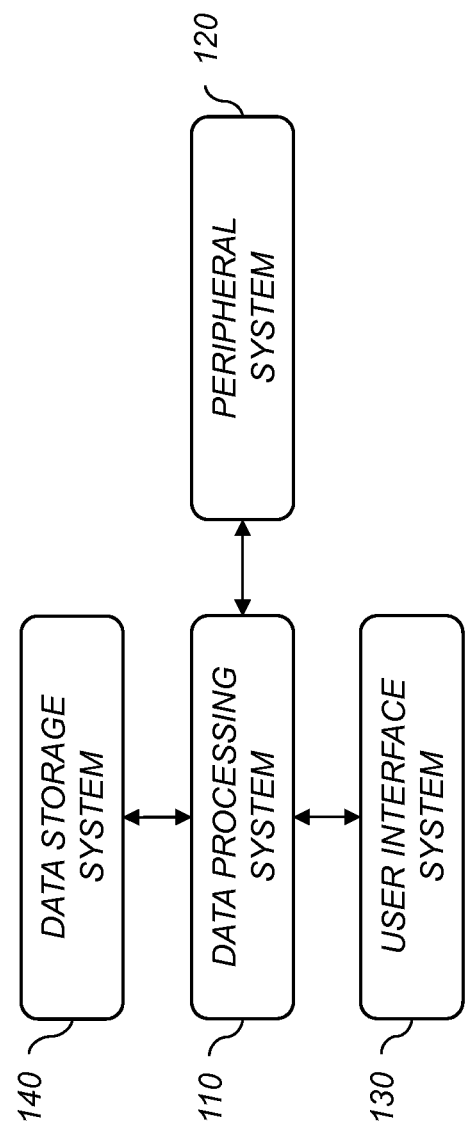
FIG. 1 is a high-level diagram showing the components of a system for enhancing a digitized image according to an embodiment of the present invention.

FIG. 1 is a high-level diagram showing the components of a system for enhancing a digitized image according to an embodiment of the present invention. The system includes a data processing system 110, a peripheral system 120, a user interface system 130, and a data storage system 140. The peripheral system 120, the user interface system 130 and the data storage system 140 are communicatively connected to the data processing system 110.

The data processing system 110 includes one or more data processing devices that implement the processes of the various embodiments of the present invention, including the example processes described herein. The phrases "data processing device" or "data processor" are intended to include any data processing device, such as a central processing unit ("CPU"), a desktop computer, a laptop computer, a mainframe computer, a personal digital assistant, a Blackberry™, a digital camera, cellular phone, or any other device for processing data, managing data, or handling data, whether implemented with electrical, magnetic, optical, biological components, or otherwise.

The data storage system 140 includes one or more processor-accessible memories configured to store information, including the information needed to execute the processes of the various embodiments of the present invention, including the example processes described herein. The data storage system 140 may be a distributed processor-accessible memory system including multiple processor-accessible memories communicatively connected to the data processing system 110 via a plurality of computers or devices. On the other hand, the data storage system 140 need not be a distributed processor-accessible memory system and, consequently, may include one or more processor-accessible memories located within a single data processor or device.

The phrase "processor-accessible memory" is intended to include any processor-accessible data storage device, whether volatile or nonvolatile, electronic, magnetic, optical, or otherwise, including but not limited to, registers, floppy disks, hard disks, Compact Discs, DVDs, flash memories, ROMs, and RAMs.

The phrase "communicatively connected" is intended to include any type of connection, whether wired or wireless, between devices, data processors, or programs in which data may be communicated. The phrase "communicatively connected" is intended to include a connection between devices or programs within a single data processor, a connection between devices or programs located in different data processors, and a connection between devices not located in data processors at all. In this regard, although the data storage system 140 is shown separately from the data processing system 110, one skilled in the art will appreciate that the data storage system 140 may be stored completely or partially within the data processing system 110. Further in this regard, although the peripheral system 120 and the user interface system 130 are shown separately from the data processing system 110, one skilled in the art will appreciate that one or both of such systems may be stored completely or partially within the data processing system 110.

The peripheral system 120 may include one or more devices configured to provide digital content records to the data processing system 110. For example, the peripheral system 120 may include digital still cameras, digital video cameras, cellular phones, or other data processors. The data processing system 110, upon receipt of digital content records from a device in the peripheral system 120, may store such digital content records in the data storage system 140.

The user interface system 130 may include a mouse, a keyboard, another computer, or any device or combination of devices from which data is input to the data processing system 110. In this regard, although the peripheral system 120 is shown separately from the user interface system 130, the peripheral system 120 may be included as part of the user interface system 130.

The user interface system 130 also may include a display device, a processor-accessible memory, or any device or combination of devices to which data is output by the data processing system 110. In this regard, if the user interface system 130 includes a processor-accessible memory, such memory may be part of the data storage system 140 even though the user interface system 130 and the data storage system 140 are shown separately in FIG. 1.

Figure 2:
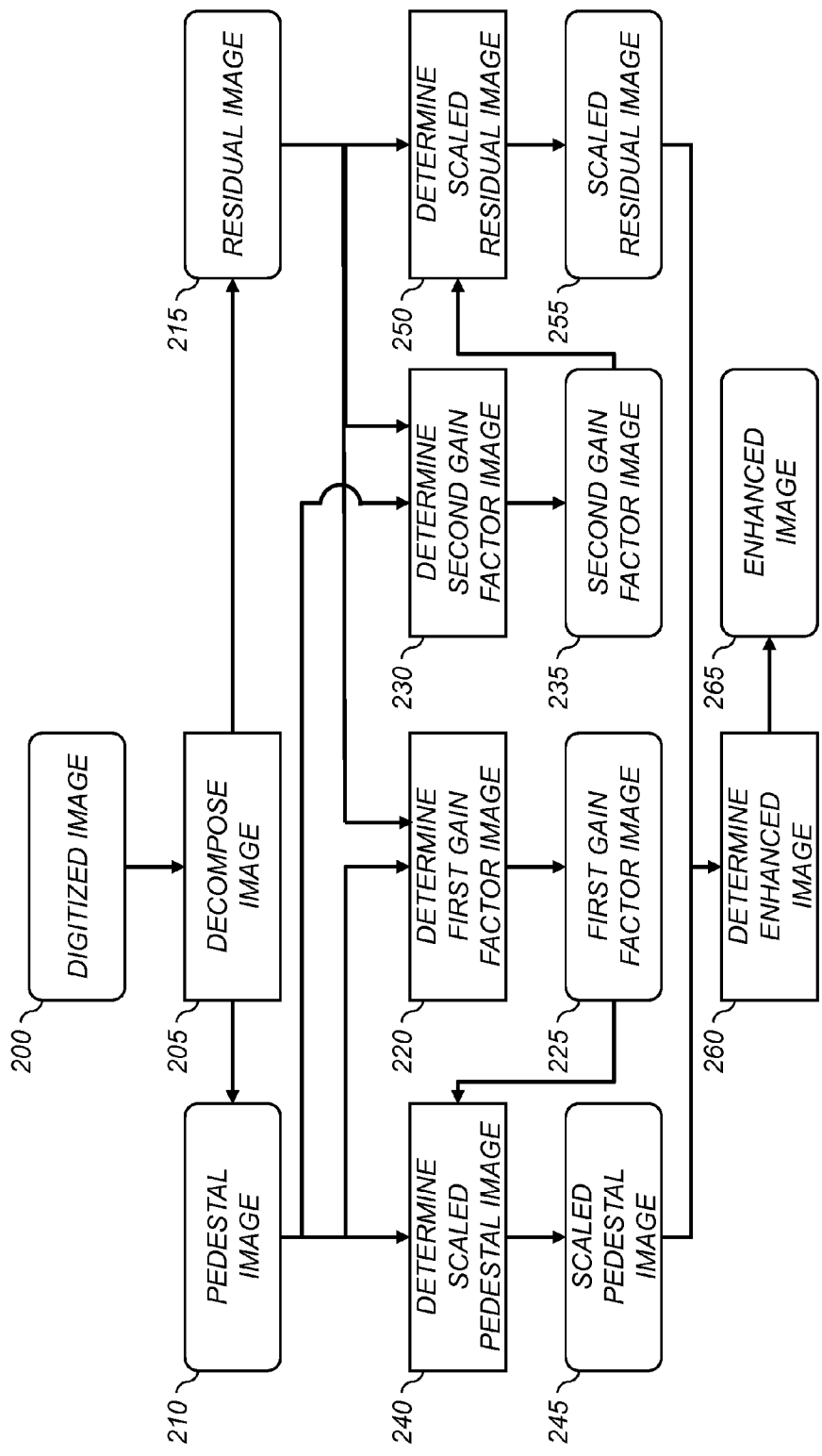
FIG. 2 is a flowchart of a method for enhancing a digitized document in accordance with the present invention.

The present invention will now be described with reference to FIG. 2. A digitized image 200, having been received by the data processing system 110 of FIG. 1 from the data storage system 140, the user interface system 130, or the peripheral system 120, is decomposed by a decompose image step 205 into a pedestal image 210 and a residual image 215. The pedestal image 210 contains primarily the low-frequency content of the digitized image 200 and the residual image contains primarily the high-frequency content of the digitized image 200. In a preferred embodiment, the digitized image 200 is digitized by a digital scanner, a digital camera or a smart phone.

A determine first gain factor image step 220 determines a first gain factor image 225 responsive to the residual image 215 and the pedestal image 210. As will be discussed in more detail later with reference to FIG. 4, the first gain factor image 225 is such that its pixel values are substantially equal to a first maximum gain 420 for non-negative pixel values in the residual image 215, and its pixel values are substantially equal to a first minimum gain 425 for pixel values in the residual image 215 that are less than a residual threshold 445. The first maximum gain 420 is determined to map a current white 405 determined from the pedestal image 210 to a target white 410 (e.g., about 255 for 8-bit images). As the pixel values of the residual image 215 vary from the residual threshold 445 to zero, the corresponding pixel values of the first gain factor image 225 increase monotonically from the first minimum gain 425 to the first maximum gain 420. In some embodiments, linear interpolation is used to transition between the first minimum gain 425 and the first maximum gain 420.

A determine scaled pedestal image step 240 uses the pedestal image 210 and the first gain factor image 225 to determine a scaled pedestal image 245. In a preferred embodiment, the scaled pedestal image 245 has pixel values that are substantially equal to the target white 410 where the first gain factor image 225 is substantially equal to the first maximum gain 420 and the pixel values are substantially the same as the pedestal image 210 where the first gain factor image 225 is substantially equal to the first minimum gain 425. In a preferred embodiment, the determine scaled pedestal image step 240 determines the scaled pedestal image 245 by pixel-wise multiplication of the first gain factor image 225 with the pedestal image 210.

A determine second gain factor image step 230 determines a second gain factor image 235 responsive to the residual image 215 and the pedestal image 210. As will be discussed in more detail later with reference to FIG. 5, the second gain factor image 235 is such that its pixel values are substantially equal to a second minimum gain 530 for non-negative pixel values in the residual image 215, and its pixel values are substantially equal to a second maximum gain 525 for pixel values in the residual image 215 that are less than a current black 515 determined for the residual image 215. The second maximum gain 525 is determined to map the current black 515 to a target black 505 (e.g., about −128 for 8-bit images). As the pixel values of the residual image 215 vary from the current black 515 to zero, the corresponding pixel values of the second gain factor image 235 vary monotonically from the second maximum gain 525 to the second minimum gain 530. In some embodiments, linear interpolation is used to transition between the second maximum gain 525 and the second minimum gain 530.

A determine scaled residual image step 250 uses the residual image 215 and the second gain factor image 235 to determine a scaled residual image 255. In a preferred embodiment, the scaled residual image 255 has pixel values that are substantially equal to the target black 505 where the second gain factor image 235 is substantially equal to the second maximum gain 525, and pixel values that are substantially the same as the residual image 215 where the second gain factor image 235 is substantially equal to the second minimum gain 530. In a preferred embodiment, the determine scaled residual image step 250 determines the scaled residual image 255 by pixel-wise multiplication of the second gain factor image 235 with the residual image 215.

A determine enhanced image step 260 combines the scaled pedestal image 245 and the scaled residual image 255 to determine an enhanced image 265. In a preferred embodiment, the determine enhanced image step 260 combines the scaled pedestal image 245 and the scaled residual image 255 by summing them together to determine the enhanced image 265. The enhanced image 265 can then be stored in a processor-accessible memory (e.g., in the data storage system 140 of FIG. 1) for uses such as viewing, printing or archiving.

Figure 3:
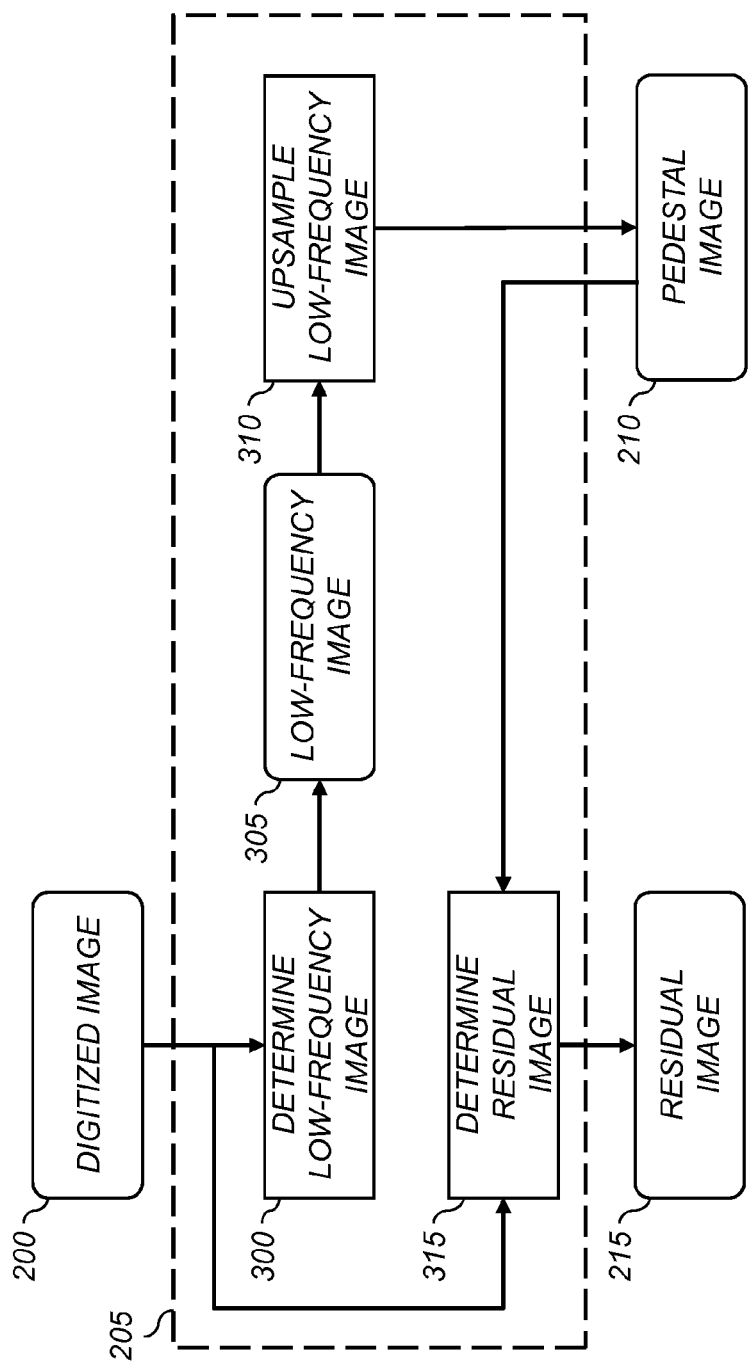
FIG. 3 is a flowchart showing additional details for the decompose image step of FIG. 2.

The decompose image step 205 will now be described in more detail with reference to FIG. 3. A determine low-frequency image step 300 determines a low-frequency image 305 utilizing any suitable method known in the art to produce a "low-pass" image.

In some embodiments, the method described by Gallagher et al. in commonly assigned U.S. Pat. No. 6,317,521, entitled "Method for preserving image detail when adjusting the contrast of a digital image," is used to determine the low-frequency image 305. This method uses a Gaussian convolution filter with standard deviation of 2.5 pixels to produce the low-frequency image 305. In other embodiments, a Gaussian pyramid can be used to produce the low-frequency image 305. In a preferred embodiment of the present invention, a wavelet transform at least six levels deep is used to produce the low-frequency image 305, which will be a low-resolution approximation image to the digitized image 200.

An upsample low-frequency image step 310 increases the resolution (i.e., the total number of pixels) of the low-frequency image 305 to the same resolution as the digitized image 200 to produce the pedestal image 210. The upsample low-frequency image step 310 can use any upsampling method known in the art to upsample the low-frequency image 305. For example, the low-frequency image 305 can be upsampled using pixel replication, or using an appropriate interpolation method (e.g., bilinear or bicubic interpolation).

In some embodiments, the low-frequency image 305 may already have the same resolution as the digitized image 200 depending on the method used by the determine low-frequency image step 300. In such cases, the upsample low-frequency image step 310 can be skipped.

A determine residual image step 315 is used to determine the residual image 215 that contains primarily the high-frequency content in the digitized image 200. Any frequency content in the digitized image 200 that is not contained in the pedestal image 210 is considered to comprise the high-frequency content. The determine residual image step 315 can use any method known in the art to determine the residual image 215. In a preferred embodiment, the residual image 215 is produced by subtracting the pedestal image 210 from the digitized image 200.

The determine first gain factor image step 220 in FIG. 2 will now be described in more detail with reference to FIG. 4. A determine current white step 400 determines a current white 405 by analyzing the pedestal image. In some embodiments, the current white 405 is determined using the mean $<P>$ and standard deviation $\sigma_P$ of the pixel values in the pedestal image 210 (P). In a preferred embodiment, the current white 405 ($W_c$) is defined to be a value that is a certain predefined number of standard deviations away from the mean:

$$W_c = <P> + \alpha_P \sigma_P \quad (1)$$

where $\alpha_P$ is a predefined constant, which is preferably negative. In a preferred embodiment, $\alpha_P$ is equal to −3.

A determine first maximum gain step 415 determines a first maximum gain 420 (Gmax1) responsive to the current white 405 and a predefined target white 410. In a preferred embodiment, the first maximum gain 420 ($G_{max,1}$) is determined by dividing the target white 410 ($W_t$) by the current white 405 ($W_c$):

$$G_{max,1} = W_t/W_c. \quad (2)$$

The target white 410 is preferably equal to 255 for 8-bit images, but can be set to any preferred white value.

A determine residual threshold step 440 is used to determine a residual threshold 445. Preferably, the residual threshold 445 is determined such that a pixel in the residual image 215 having a pixel value below the residual threshold 445 corresponds to foreground content in the digitized image 200, and a pixel in the residual image 215 having a pixel value above the residual threshold 445 corresponds to background content in the digitized image 200. In a preferred embodiment, the determine residual threshold step 440 calculates a non-directional gradient ($\nabla R$) of the residual image 215 (R):

$$\nabla R = \sqrt{(\nabla_v R)^2 + (\nabla_h R)^2} \quad (3)$$

where $\nabla_v R$ is a vertical-direction gradient of the residual image 215 and $\nabla_h R$ is a horizontal-direction gradient of the residual image 215. The residual threshold 445 ($T_R$) is then determined to be a value that is a certain predetermined number of standard deviations away from the mean of the non-directional gradient of the residual image 215:

$$T_R = <\nabla R> + \beta \sigma_{\nabla R} \quad (4)$$

where $\beta$ is a predefined constant, which is preferably negative, $<\nabla R>$ is the mean of the non-directional gradient of the residual image 215 and $\sigma_{\nabla R}$ is the standard deviation of the non-directional gradient of the residual image 215. In a preferred embodiment of the present invention, $\beta$ is equal to −3.

Figure 6A:
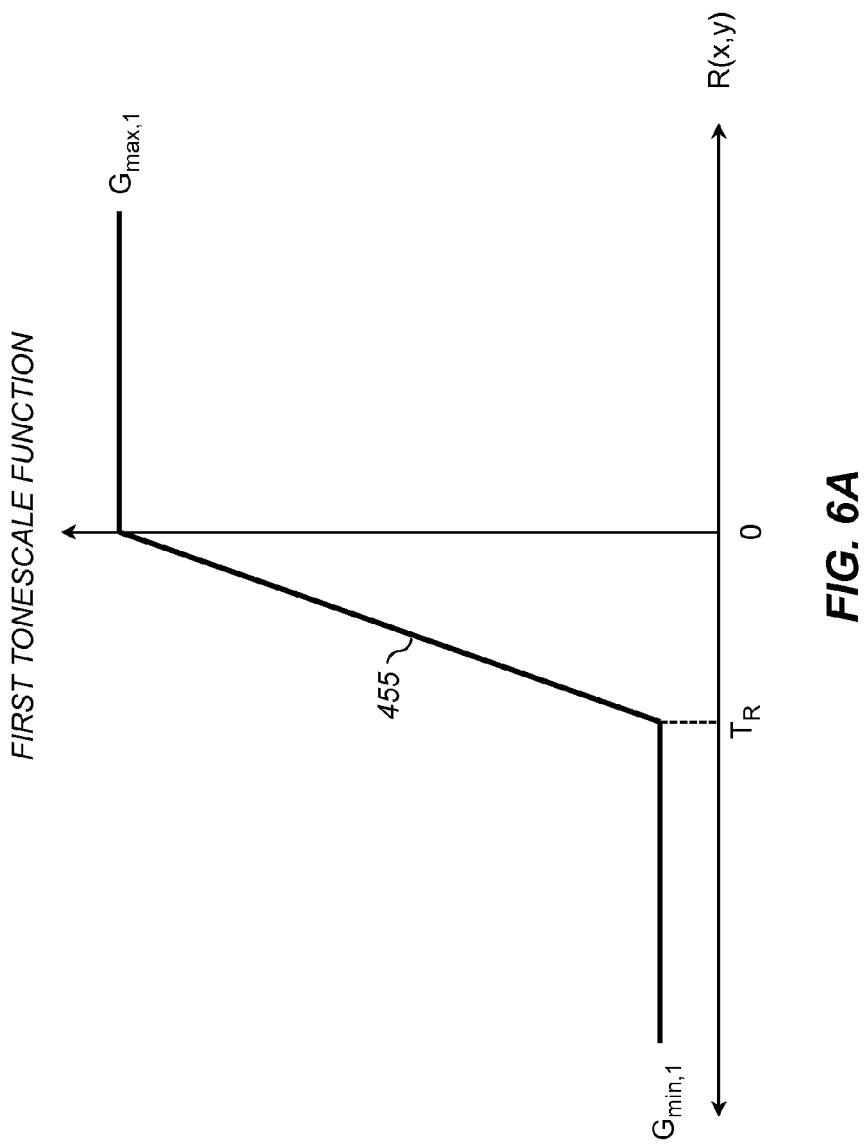
FIG. 6A is a graph of an example first tonescale function.

A determine first tonescale function step 450 is used to determine a first tonescale function 455 for application to the residual image 215. In a preferred embodiment, the first tonescale function 455 maps non-negative pixel values in the residual image 215 to the first maximum gain 420, and maps pixel values in the residual image 215 that are less than the residual threshold 445 to a predefined first minimum gain 425. In a preferred embodiment, the first minimum gain 425 is equal to 1.0. FIG. 6A shows a graph of an example first tonescale function 455 having these characteristics. In this case, the first tonescale function 455 linearly increases from the first minimum gain 425 ($G_{min,1}$) to the first maximum gain 420 ($G_{max,1}$) as the pixel values in the residual image 215 (R(x,y)) transition from the residual threshold 445 ($T_R$) to zero. In other embodiments, different functional shapes can be used for the first tonescale function 455, such as sigmoidal functions or segment-wise exponential functions, as long as they are monotonically increasing (non-monotonic functions will generally not provide visually pleasing results).

Figure 4:
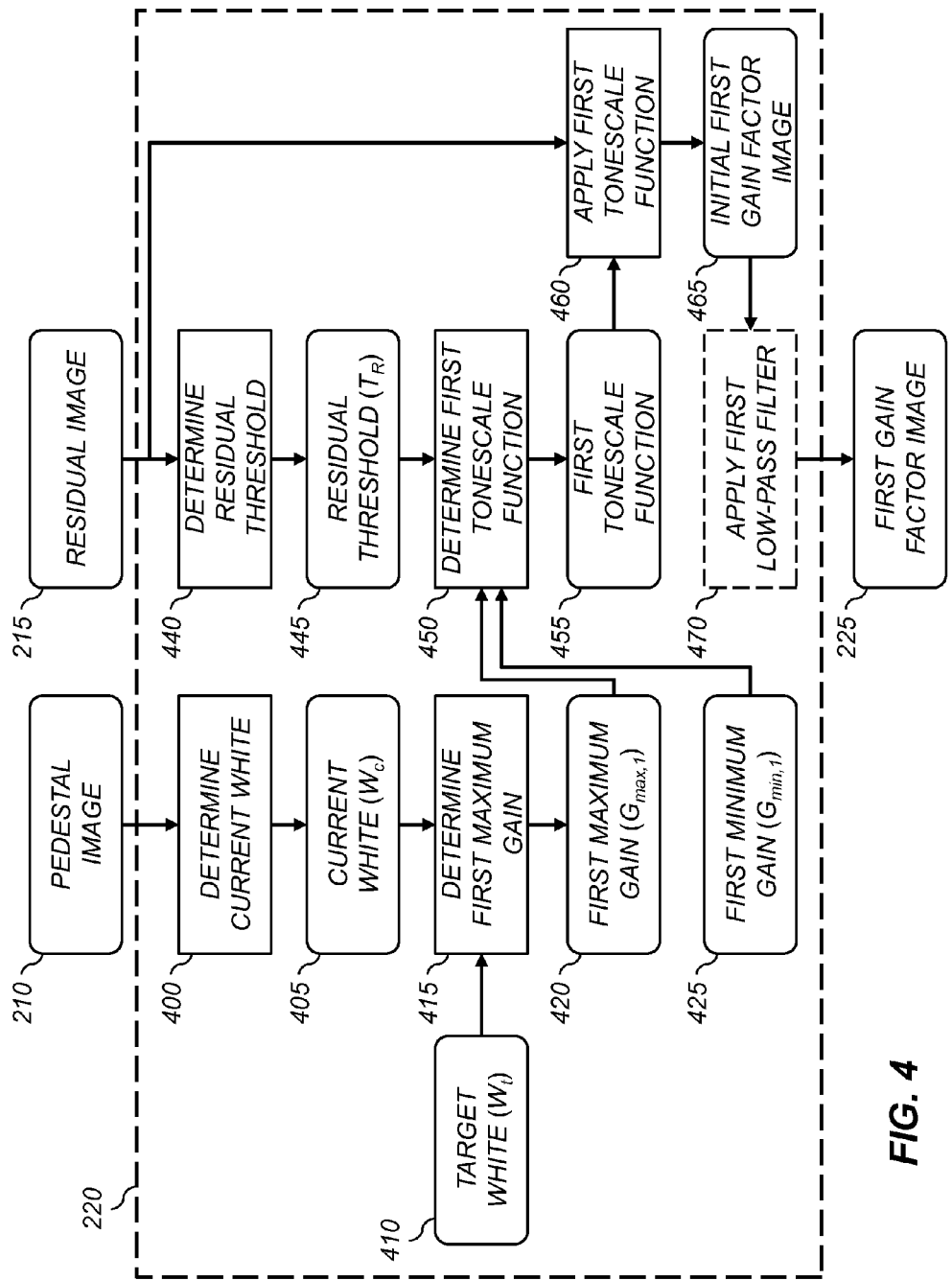
FIG. 4 is a flowchart showing additional details for the determine first gain factor image step of FIG. 2.

Returning to a discussion of FIG. 4, an apply first tonescale function step 460 applies the first tonescale function 455 to the residual image to determine an initial first gain factor image 465. An optional apply first low-pass filter step 470 can be used to filter the initial first gain factor image 465 with a predefined first low-pass filter to regularize the gain factors and determine the first gain factor image 225. In a preferred embodiment, the apply first low-pass filter step 470 convolves the initial first gain factor image 465 with a normalized 3×3 boxcar filter to determine the first gain factor image 225. Alternatively, the initial first gain factor image 465 can be used directly as the first gain factor image 225.

The determine second gain factor image step 230 of FIG. 2 will now be described in more detail with reference to FIG. 5. A determine current black step 510 determines a current black 515 using the mean <R> and standard deviation $\sigma_R$ of the pixel values in the residual image 215 (R). Preferably, the current black 515 ($B_c$) is defined to be a value that is a certain predefined number of standard deviations away from the mean:

$$B_c = <R> + \alpha_R \sigma_R \quad (5)$$

where $\alpha_R$ is a predefined constant, which is preferably negative. In a preferred embodiment, $\alpha_R$ is equal to −3.

A determine target black step 500 is used to determine a target black 505 ($B_t$) by analyzing the pedestal image 210. In a preferred embodiment, the determine target black step 500 sets the target black 505 to be equal to the negative of the mean <P> of the pedestal image 210 (P):

$$B_t = -<P> \quad (6)$$

A determine second maximum gain step 520 determines a second maximum gain 525 ($G_{max,2}$) by dividing the target black 505 ($B_t$) by the current black 515 ($B_c$):

$$G_{max,2} = B_t / B_c. \quad (7)$$

Figure 6B:
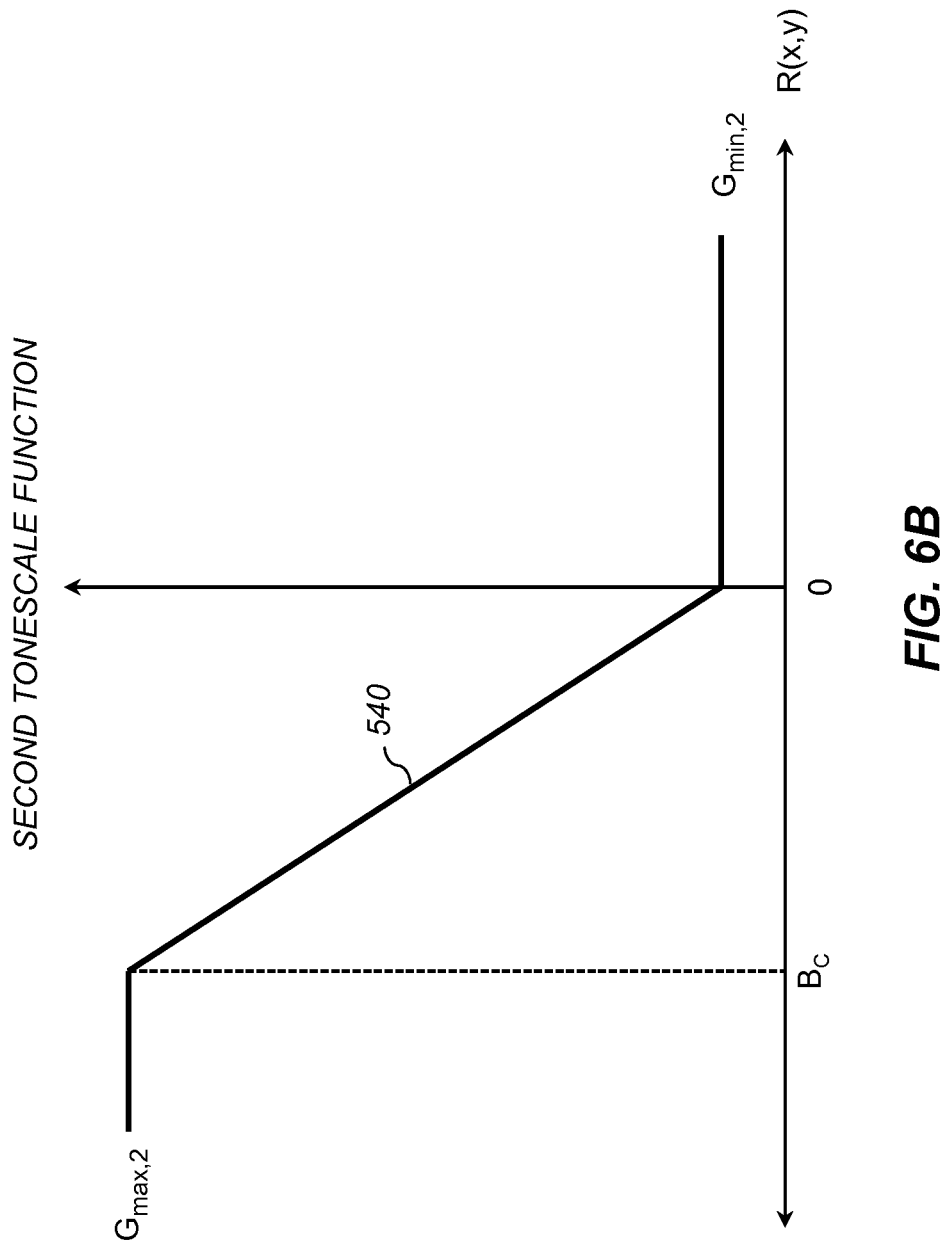
FIG. 6B is a graph of an example second tonescale function.

A determine second tonescale function step 535 is used to determine a second tonescale function 540 for application to the residual image 215. In a preferred embodiment, the second tonescale function 540 maps non-negative pixel values in the residual image 215 to a predefined second minimum gain 530 ($G_{min,2}$) and maps pixel values in the residual image 215 that are less than a second residual threshold to the second maximum gain 525 ($G_{max,2}$). Preferably, the second residual threshold is equal to the current black 515 ($B_c$). In a preferred embodiment, the second minimum gain 530 is equal to 1.0. FIG. 6B shows a graph of an example second tonescale function 540 having these characteristics. In this case, the second tonescale function 540 linearly decreases from the second maximum gain 525 ($G_{max,2}$) to the second minimum gain 530 ($G_{min,2}$) as the pixel values in the residual image 215 (R(x,y)) transition between the current black 515 ($B_c$) and zero. Other functional shapes can be used for the second tonescale function 540, such as sigmoidal functions or segment-wise exponential functions, as long as they are monotonically decreasing (non-monotonic functions will generally not provide visually pleasing results).

Figure 5:
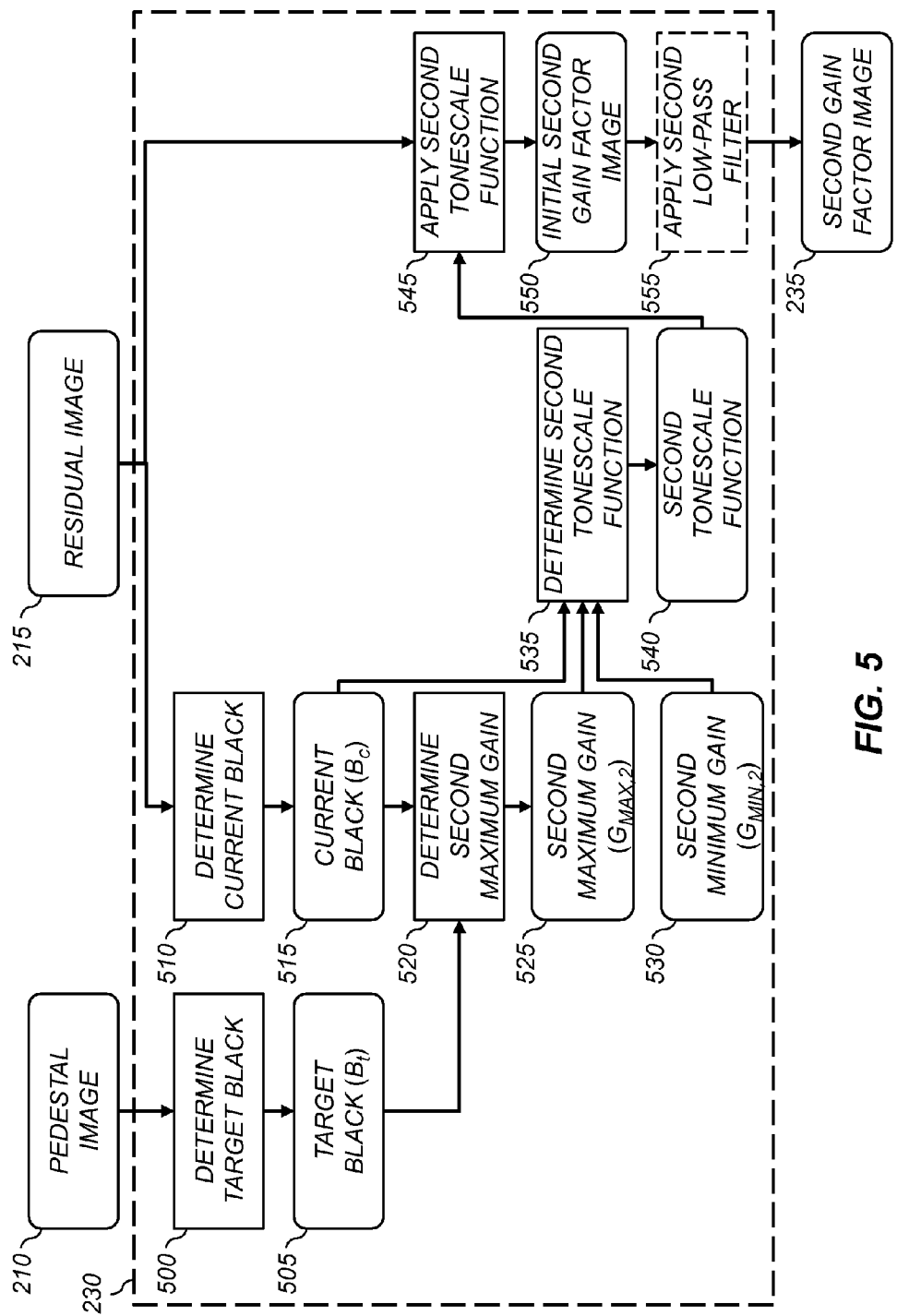
FIG. 5 is a flowchart showing additional details for the determine second gain factor image step of FIG. 2.

Returning to a discussion of FIG. 5, an apply second tonescale function step 545 applies the second tonescale function 540 to the residual image 215 to determine an initial second gain factor image 550. Optionally, an apply second low-pass filter step 555 can be used to filter the initial second gain factor image 550 with a predefined low-pass filter to regularize the gain factors and determine the second gain factor image 235. In a preferred embodiment, the apply second low-pass filter step 555 convolves the initial second gain factor image 550 with a normalized 3×3 boxcar filter to determine the second gain factor image 235. Alternatively, the initial second gain factor image 550 can be used directly as the second gain factor image 235.

The above-described method for enhancing a document image can be preceded or followed by any other types of correction and enhancement operations known in the art. Examples of such operations would include uniformity correction (e.g., to correct for non-uniformity introduced when the document was digitized), sharpening (e.g., to correct for defocus or smear) and noise reduction. Geometric transforms can also be applied to correct for lens aberrations (e.g., barrel and pin-cushion distortion), document rotation and perspective warping.

The above-described method has been described with respect to application to a single-channel image. For cases where the digitized document is a color image having a plurality of color channels, the method is preferably applied to a grayscale image that is formed from the color image. In a preferred embodiment, the single-channel image is a luminance channel determined by forming a weighted sum of the color channels in the color image. Alternately, the single-channel image corresponds to one of the color channels in the color image. Many common digital image formats, such as the well-known JPEG image format, encode digital image data in a luma-chroma color space. In such cases the method of the present invention can be applied directly to the luma color channel. The chroma values can be retained, or can alternately be set to zero to form a grayscale corrected image. In other embodiments, the method of the present invention can be applied sequentially to each color channel of a color image.

The enhanced images 265 (FIG. 2) formed according to the method of the present invention are well-suited for a variety of application such as viewing on a soft-copy display or printing on a digital printing device (e.g., an inkjet printer or a laser printer). In some embodiments, a handheld electronic device (e.g., a digital camera, a smart phone or a tablet computer) can be used to capture the digitized images 200 (FIG. 2). A software application running on the handheld electronic device can be used to implement the method of the present invention to provide the enhanced images 265, which can then be stored in a local memory, or transmitted to a network storage device or a network-accessible digital printing device (e.g., using a wireless network). In this way, the handheld electronic device can provide the function of a handheld document scanner/copying system.

Figure 7:
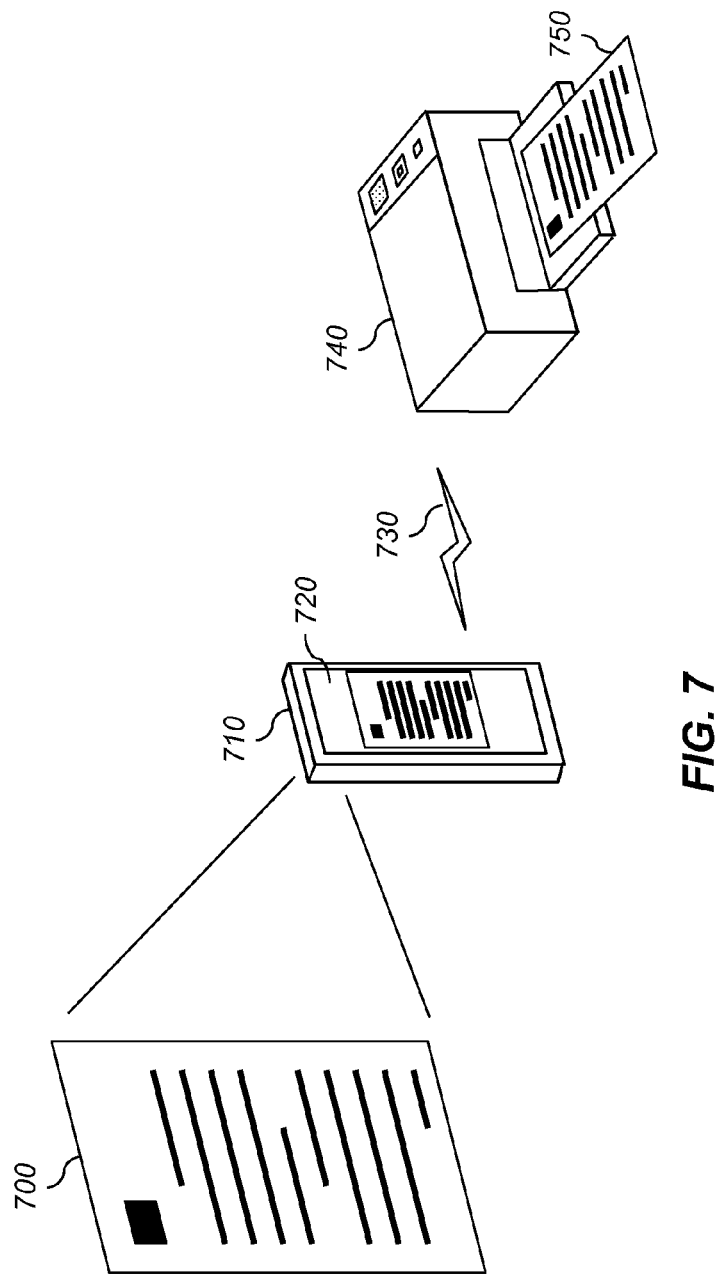
FIG. 7 is a diagram showing a digital imaging system that implements the method of the present invention.

FIG. 7 shows an example of a smart phone 710 capturing a digitized image 200 (FIG. 2) of a document 700. An application program can be downloaded onto the smart phone 710 to implement the method of the present invention. The application program can be used to process the digitized image 200 to provide an enhanced image 265 (FIG. 2), which can be viewed on a display 720 on the smart phone. The smart phone 710 can also include software that enables it to send data to a digital printing device 740 using a wireless network 730, such as a WiFi network or a cell-phone network, to produce a printed document 750.

A computer program product can include one or more non-transitory, tangible, computer readable storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention.

The invention has been described in detail with particular reference to certain preferred embodiments thereof, but it will be understood that variations and modifications can be effected within the spirit and scope of the invention.

PARTS LIST 110 data processing system
120 peripheral system
130 user interface system
140 data storage system
200 digitized image
205 decompose image step
210 pedestal image
215 residual image
220 determine first gain factor image step
225 first gain factor image
230 determine second gain factor image step
235 second gain factor image
240 determine scaled pedestal image step
245 scaled pedestal image
250 determine scaled residual image step
255 scaled residual image
260 determine enhanced image step
265 enhanced image
300 determine low-frequency image step
305 low-frequency image
310 upsample low-frequency image step
315 determine residual image step
400 determine current white step
405 current white
410 target white
415 determine first maximum gain step
420 first maximum gain
425 first minimum gain
440 determine residual threshold step
445 residual threshold
450 determine first tonescale function
455 first tonescale function
460 apply first tonescale function step
465 initial first gain factor image
470 apply first low-pass filter step
500 determine target black step
505 target black
510 determine current black step
515 current black
520 determine second maximum gain step
525 second maximum gain
530 second minimum gain
535 determine second tonescale function step
540 second tonescale function
545 apply second tonescale function step
550 initial second gain factor image
555 apply second low-pass filter step
700 document
710 smart phone
720 display
730 wireless network
740 digital printing device
750 printed document

The invention claimed is:

1. A method for enhancing a document image, the method implemented at least in part by a data processing system and comprising:

receiving a digitized image of a document containing text or graphics, the digitized image including an array of pixels having pixel values;

decomposing the digitized image into a pedestal image and a residual image, low-spatial-frequency content in the digitized image being primarily represented by the pedestal image and high-spatial-frequency content in the digitized image being primarily represented by the residual image;

determining a first gain factor image wherein the pixel values of the first gain factor image are a continuous monotonic function of the corresponding residual image pixel values, the first gain factor image pixel values being substantially equal to a first maximum gain for non-negative residual image pixel values, and the first gain factor image pixel values being substantially equal to a first minimum gain for residual image pixel values that are less than a first residual threshold;

determining a second gain factor image wherein the pixel values of the second gain factor image are a continuous monotonic function of the corresponding residual image pixel values, the second gain factor image pixel values being substantially equal to a second minimum gain for non-negative residual image pixel values, and the second gain factor image pixel values being substantially equal to a second maximum value for residual image pixel values less than a second residual threshold;

determining a scaled pedestal image by multiplying the pedestal image by the first gain factor image;

determining a scaled residual image by multiplying the residual image by the second gain factor image;

determining an enhanced document image by combining the scaled pedestal image and the scaled residual image; and storing the enhanced document image in a processor accessible memory.

2. The method of claim 1 further including determining a current white, and wherein the first maximum value is equal to a ratio of a target white point to the current white.

3. The method of claim 2 wherein the current white is determined by analyzing a distribution of pedestal image pixel values.

4. The method of claim 3 wherein the current white is determined by calculating a mean and standard deviation of the pedestal image pixel values, and setting the current white to be equal to the mean of the pedestal image pixel values minus a predefined number of standard deviations of the pedestal image pixel values.

5. The method of claim 1 further including determining a current black and a target black, and wherein the second maximum value is equal to a ratio of the target black to the current black.

6. The method of claim 5 wherein the current black is determined by analyzing a distribution of residual image pixel values.

7. The method of claim 6 wherein the current black is determined by calculating a mean and a standard deviation of the residual image pixel values, and setting the current black to be equal to the mean of the residual image pixel values minus a predefined number of standard deviations of the residual image pixel values.

8. The method of claim 5 wherein the target black is determined by analyzing a distribution of pedestal image pixel values.

9. The method of claim 8 wherein the target black is determined by calculating a mean of the pedestal image pixel values, and setting the target black to be equal to negative one times the mean of the pedestal image pixel values.

10. The method of claim 1 wherein the first minimum gain is substantially equal to one and the second minimum gain is substantially equal to one.

11. The method of claim 1 further including the step of convolving the first gain factor image with a low-pass filter before using it to determine the scaled pedestal image.

12. The method of claim 1 further including the step of convolving the second gain factor image with a low-pass filter before using it to determine the scaled residual image.

13. The method of claim 1 wherein the digitized image is captured using a digital camera or a digital scanner.

14. The method of claim 1 wherein the document has a substantially uniform background.

15. The method of claim 1 wherein the residual image is equal to the digitized image minus the pedestal image.

16. The method of claim 1 wherein a wavelet transform is used to decompose the digitized image into the pedestal image and the residual image.

17. The method of claim 1 further including applying a geometric transform to the digitized image to correct for lens aberrations, perspective warping or rotation introduced when the document was digitized to provide the digitized image.

18. The method of claim 1 further including applying a uniformity correction operation to compensate for non-uniformity introduced when the document was digitized to provide the digitized image.

19. The method of claim 1 wherein the digitized image is a grayscale digitized image that was formed from a color digitized image.

20. The method of claim 1 wherein the digitized image is a luminance channel of a color digitized image.

21. The method of claim 1 further including printing the enhanced document image using a digital printing device.

22. A digital imaging system comprising:
   an image sensor for capturing a digitized image;
   an optical system for forming an image of a document onto the image sensor;
   a data processing system; and
   a memory system communicatively connected to the data processing system and storing instructions configured to cause the data processing system to implement a method for enhancing a document image, wherein the method includes:
      using the image sensor to capture a digitized image of a document containing text or graphics, the digitized image including an array of pixels having pixel values;
      decomposing the digitized image into a pedestal image and a residual image, the low-spatial-frequency content in the digitized image being primarily represented by the pedestal image and the high-spatial-frequency content in the digitized image being primarily represented by the residual image;
      determining a first gain factor image wherein the pixel values of the first gain factor image are a continuous monotonic function of the corresponding residual image pixel values, the first gain factor image pixel values being substantially equal to a first maximum gain for non-negative residual image pixel values, and the first gain factor image pixel values being substantially equal to a first minimum gain for residual image pixel values that are less than a first residual threshold;
      determining a second gain factor image wherein the pixel values of the second gain factor image are a continuous monotonic function of the corresponding residual image pixel values, the second gain factor image pixel values being substantially equal to a second minimum gain for non-negative residual image pixel values, and the second gain factor image pixel values being substantially equal to a second maximum value for residual image pixel values less than a second residual threshold;
      determining a scaled pedestal image by multiplying the pedestal image by the first gain factor image;
      determining a scaled residual image by multiplying the residual image by the second gain factor image;
      determining an enhanced document image by combining the scaled pedestal image and the scaled residual image;
      storing the enhanced document image in a processor accessible memory.

23. The method of claim 22 wherein the digital imaging system is a digital scanner, a digital camera or a camera phone.

* * * * *